(12) United States Patent
Goossen

(10) Patent No.: US 9,877,167 B2
(45) Date of Patent: Jan. 23, 2018

(54) COMMUNICATION ROUTER APPARATUS AND METHOD OF USE THEREOF

(71) Applicant: Rodney Goossen, Lakewood, CO (US)

(72) Inventor: Rodney Goossen, Lakewood, CO (US)

( * ) Notice: Subject to any disclaimer, the term of this patent is extended or adjusted under 35 U.S.C. 154(b) by 0 days.

(21) Appl. No.: 14/720,763

(22) Filed: May 23, 2015

(65) Prior Publication Data

US 2016/0345140 A1  Nov. 24, 2016

(51) Int. Cl.
*H04W 4/06* (2009.01)
*H04W 4/00* (2009.01)

(52) U.S. Cl.
CPC ............. *H04W 4/06* (2013.01); *H04W 4/008* (2013.01)

(58) Field of Classification Search
CPC ..... H04B 7/15507; H04W 4/06; H04W 4/008
USPC ........................................................ 455/566
See application file for complete search history.

(56) References Cited

U.S. PATENT DOCUMENTS

| | | | | |
|---|---|---|---|---|
| 7,764,978 B1* | 7/2010 | West | ................... | H04B 7/15507 370/338 |
| 2002/0177401 A1* | 11/2002 | Judd | ....................... | H01Q 1/007 455/11.1 |
| 2003/0192053 A1* | 10/2003 | Sheppard | ............... | H04H 20/63 725/81 |
| 2004/0058677 A1* | 3/2004 | Chang-Hung | .......... | H04L 69/04 455/426.2 |
| 2004/0110466 A1* | 6/2004 | Perlman | ............. | H04B 7/18517 455/12.1 |
| 2004/0130732 A1* | 7/2004 | Denpo | ............... | H04N 1/00326 358/1.1 |
| 2004/0163128 A1* | 8/2004 | Phillips | ............... | H04L 65/1036 725/120 |
| 2006/0223439 A1* | 10/2006 | Pinel | ................... | H04B 7/15535 455/11.1 |
| 2008/0056222 A1* | 3/2008 | Waites | .................. | H04W 88/00 370/342 |
| 2009/0298445 A1* | 12/2009 | Tylicki | ..................... | H04B 1/08 455/91 |
| 2011/0136432 A1* | 6/2011 | Miller, II | .................. | H01P 3/10 455/41.2 |
| 2012/0071094 A1* | 3/2012 | Hyland | ................ | H04B 5/0031 455/41.2 |
| 2012/0297426 A1* | 11/2012 | Ling | ................ | H04N 21/43615 725/68 |
| 2016/0301474 A1* | 10/2016 | Bourg | .................... | H04B 10/27 |

* cited by examiner

*Primary Examiner* — King Poon
*Assistant Examiner* — Vincent Peren
(74) *Attorney, Agent, or Firm* — Kevin Hazen

(57) ABSTRACT

The invention comprises an outside transceiver relaying digital television, internet, and/or phone data from a provider through an exterior wall of a personal residence or building to an inside transceiver, the inside transceiver used to distribute the data to one or more interior devices. The outside transceiver is optionally a small, AC-powered, weatherproof, high-speed, high-bandwidth transceiver configured to transmit and/or receive physical and/or wireless connections with remote services, that is positioned outside of a structure and used to encrypt and/or transfer the data over a limited range through an exterior wall to the inside transceiver, which is a small AC-powered device configured to decrypt and distribute the received transmitted signal, such as wirelessly, via an HDMI port, via an Ethernet port, via a co-axial cable, via a fiber optic line, and/or to any Wi-Fi enabled device within a transmission range.

14 Claims, 5 Drawing Sheets

COMMUNICATION ROUTER APPARATUS AND METHOD OF USE THEREOF

BACKGROUND OF THE INVENTION

Field of the Invention

The invention relates to easing connection of communication sources with information receivers, such as through use of a router/receiver, where an information receiver is optionally a transmitter, router/receiver, and/or a router transceiver.

Discussion of the Prior Art

Despite decades of advancements in communications, such as television, internet, or phone service, the last five hundred feet of distribution of a signal remains a significant challenge to do quickly, inexpensively, and without disrupting busy lives of clients.

Television, cable, satellite, internet, and phone companies all require running a communication line into a home or workplace. The installation process damages existing property due the need to penetrate into the structure. Particularly, service provider installers typically drill holes through a foundation and/or through perimeter walls of the structure to run communication lines. Further, the intrusive installation process typically requires a presence of the property owner or a representative thereof due to access to interior rooms of the structure and/or security concerns. Still further, the installation of the communication lines is tedious, time consuming, and requires installation by specially trained employees. The process is further complicated by often having to run additional interior lines, which typically require access to inconvenient places.

PROBLEM

What is needed is a system for facilitating communications the final five hundred feet to a personal residence and/or a small business.

SUMMARY OF THE INVENTION

The invention comprises a communication system communicating signal, data, services, and/or requests wirelessly through a building perimeter.

DESCRIPTION OF THE FIGURES

A more complete understanding of the present invention is derived by referring to the detailed description and claims when considered in connection with the Figures, wherein like reference numbers refer to similar items throughout the Figures.

Figure 1A:
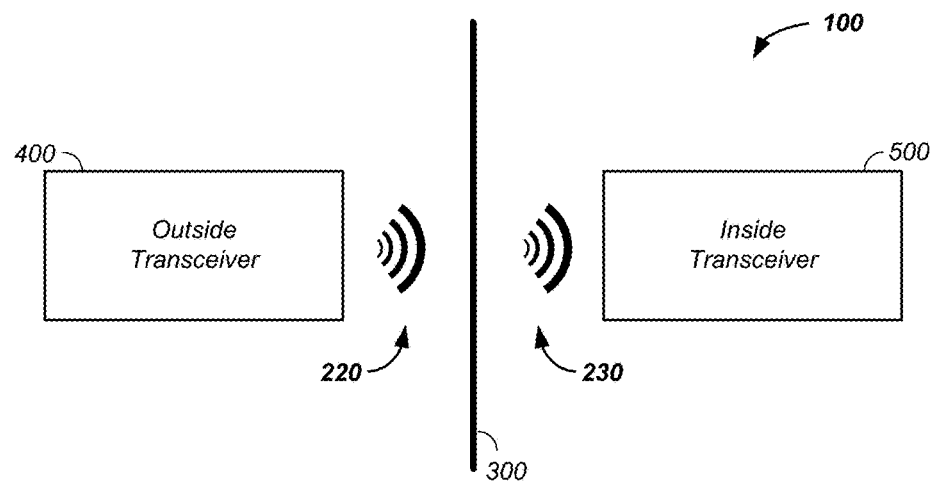
FIG. 1A illustrates an outside transmitter communicating with an inside receiver and FIG. 1B illustrates an outside transceiver equipped with a reflective surface.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises a communication system, implemented as an outside transceiver communicating data and/or services with an inside transceiver.

In one embodiment, a signal from a provider is delivered to an outside communication device, such as an outside transceiver, an outside receiver, and/or an outside router. The outside communication device wirelessly transmits the signal from the provider to an inside communication device, such as an inside transceiver, an inside receiver, and/or an inside router.

In another embodiment, a signal and/or a request from a device within an interior of a structure is transmitted, optionally via an interior transceiver, through an outer wall of the structure to an exterior transceiver. The exterior transceiver communicates the signal/request to the internet and/or to a service provider.

In still another embodiment, an outside transceiver positioned outside of a structure communicates with an interior transceiver positioned inside the structure. Communication between the outside and inside transceivers is optionally in both directions. Encryption is optionally applied to the incoming signal, outgoing signal, or both.

In a non-limiting example used to clarify the invention, an incoming cable, satellite, internet, or phone signal, such as a digital phone signal, is received outside a structure, such as with a transceiver or router. The outside transceiver is optionally and preferably a small, AC-powered, weatherproof, high-speed, high-bandwidth transceiver positioned outside of the structure, which is a home, an apartment, a place of residence, or a business. The signal received and/or transmitted by the transceiver is optionally and preferably a subscribed signal, a television cable/satellite signal, a standard definition or high-definition television signal, an internet signal, a digital phone signal, a super HDTV signal, and/or a super high definition DVD transmission, such as a signal greater than 0.5, 1, 5, 10, 20, 50, 100, 300, or 500 gigabyte per second range. Optionally, the transceiver and/or transmitter and the receiver are configured to compress and/or decompress the signal, which is optionally encrypted and/or transmitted over multiple channels, such as in the transmission signal. Optionally and preferably, the received signal includes an encrypted short-wave radio transmission, such as an IEEE Wi-Fi standard 802.11n signal and/or an IEEE 802.11ac signal, IEEE 802.11ac and/or subsequent IEEE Wi-Fi standard signal. The outside transceiver subsequently transmits the received signal over a limited range, such as less than about five hundred feet from the transceiver. The transmitted signal is optionally encrypted. A second interior transceiver receives, also referred to as the inside transceiver, the signal transmitted by the first exterior transceiver, also referred to as the outside transceiver and/or outside receiver. Optionally and preferably, the interior transceiver is one or more small AC-powered receivers, such as one for each subscribed television in a place of operation, billed separately by the cable/satellite TV signal provider. The interior receiver optionally decrypts the received transmitted signal. The interior receiver forwards, sends, and/or distributes the received signal to one or more interior devices, such as a television, a phone, a digital phone, a phablet, a tablet, and/or a computer. The interior transceiver optionally contains hardware and/or connectors to facilitate the distribution of the signal, such as an AC outlet, HDMI port, Ethernet port, coaxial cable, fiber optic line, and/or wireless transmitter. Optionally, the interior receiver: (1) is a home router or (2) communicates with a home router.

From a business perspective, the outside/inside transceiver combination has multiple advantages. For example, the ease of installation optionally involving only plugging in the interior receiver eases the mind of a potential customer.

Further, minimal installation time reduces potential client time, which reduces time away from their personal life and/or work. Still further, profitability of the communication provider is enhanced by reducing and/or minimizing installation time, which reduces many costs such as liability, wages, and employee benefits, such as health insurance and/or retirement benefits.

The outside router-transceiver/inside receiver-transceiver combination is further described, infra.

Communication Through a Structure Perimeter

Referring now to FIG. 1A, a localized communication apparatus 100 or system for communication of information through an outer perimeter of a structure is described, where the structure is a house, an apartment, a personal residence, and/or a building, such as one building of a business. Herein, the outer perimeter of a structure is optionally: (1) a wall separating an inside of a house from an outside of the house, (2) a wall separating an inside of a business from an outside of the business, (3) a window, and/or (4) a roof. For clarity of presentation, the term outer wall 300 is used to refer to the outer perimeter of the structure, which includes a foundation, a wall, a window, and/or a roof. Positioned exterior to the outer wall 300 is an outside transceiver 400 or router 405 that sends communications through the outer wall 300 or wall to an inside transceiver 500 or receiver 505, which is positioned on the opposite side of the outer wall 300 and/or in an interior region of the structure. Herein, for clarity of presentation, the outside transceiver 400 is used to refer to one or more of: (1) an outside router and (2) an outside communication device. Similarly, for clarity of presentation, the inside transceiver 500 is used to refer to one or more of: (1) an inside receiver, (2) an inside router, and/or (3) an inside communication device. Generally, the outside transceiver 400 broadcasts a wireless signal at least toward the wall 220 and the inside transceiver 500 receives a wireless signal from the direction of the wall 230. Elements of the localized communication apparatus 100 are further described, infra.

Figure 2:
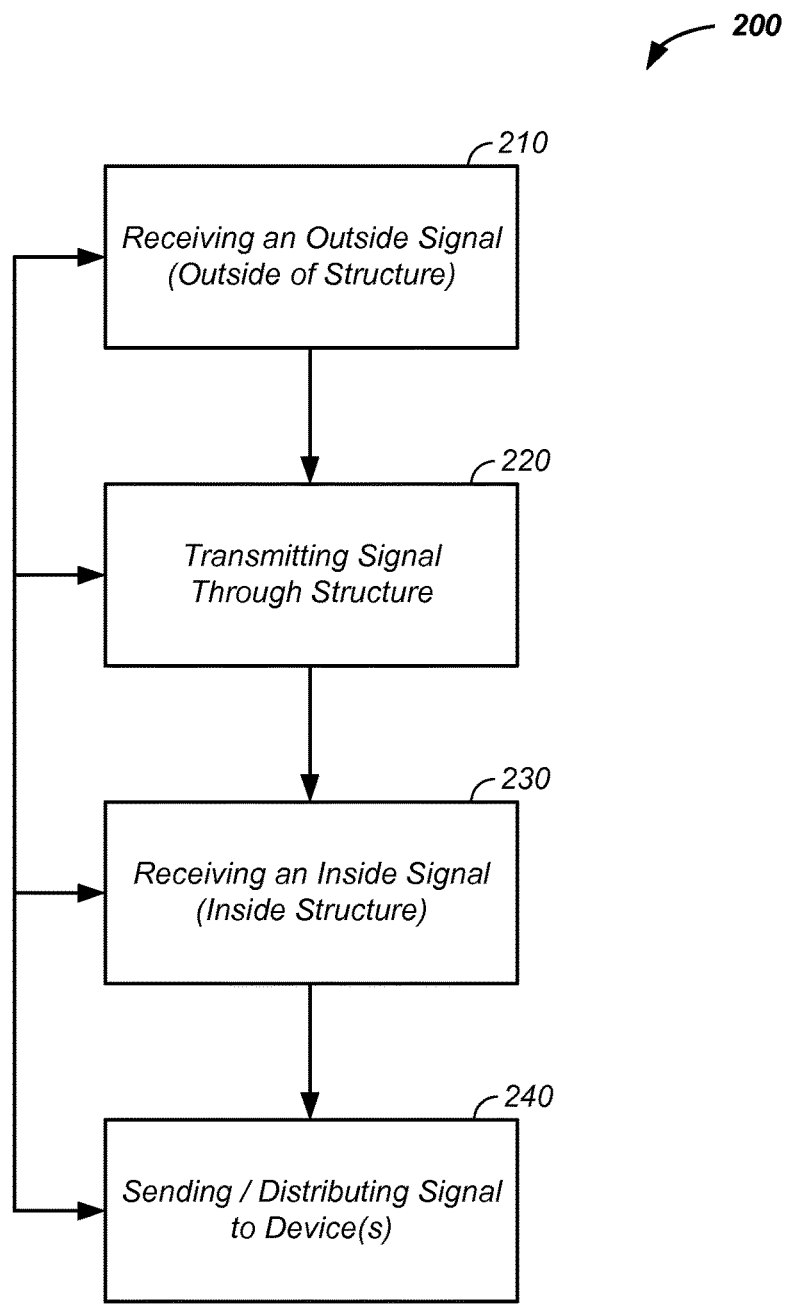
FIG. 2 illustrates a method of communication through a structure.

Referring now to FIG. 2, a localized communication method 200 using the localized communication apparatus 100 is described. The localized communication method 200 uses the outside transceiver 400 in a step of receiving an outside signal 210, which is a signal received outside of the structure. In a first case, the received outside signal 210 is from a remote business outside of the structure, described infra. In a second case, the received outside signal 210 is from a localized source inside the structure. Herein, for clarity of presentation, the clause receiving an outside signal is used to refer to the first case and/or the second case. Another step is transmitting signal 220 through the structure. In a first case, the transmitted signal is sent from the outside transceiver 400. In a second case, the transmitted signal is sent from the inside transceiver 500. In a third case, the transmitted signal is sent from one or more devices positioned within the structure. Yet another step is using the inside transceiver 500 in a step of receiving an inside signal 230. In a first case, the inside transceiver 500 receives a signal sent from the outside transceiver 400 through the outer wall 300. In a second case, the inside transceiver receives a signal sent from the one or more devices positioned within the structure. Still another step is distributing signal 240. In a first case, a distributed signal is sent from the inside transceiver 500 to the one or more devices within the structure. In a second case, the outside transceiver 400 distributes the signal directly to the one or more devices within the structure when the outside transceiver transmits the signal through the outer wall 300. Two non-limiting examples are provided to further clarify the invention.

EXAMPLE I

In a first example, the localized communication method 200 and/or the associated localized communication apparatus 100 uses the outside transceiver 400 to receive a signal from a company, such as a cable provider; uses the outside transceiver 400 to transmit the received signal through the outer wall 300 to the inside transceiver 500; and the inside transceiver 500 distributes the signal to one or more devices within the structure, such as a television.

EXAMPLE II

In a second example, the localized communication method 200 and/or the associated localized communication apparatus 100: (1) uses the inside transceiver 500 to receive a signal and/or a request from one of more of the devices within the structure and (2) uses the inside transceiver 500 to transmit the signal and/or request through the outer wall 300 to the outside transceiver 400.

Further embodiments and examples of the localized communication apparatus 100 and method 200 are still further described, infra.

Transmitted Signal(s)

Multiple examples of transmitted signals using the localized communication apparatus 100 and associated method 200 are provided.

Figure 3:
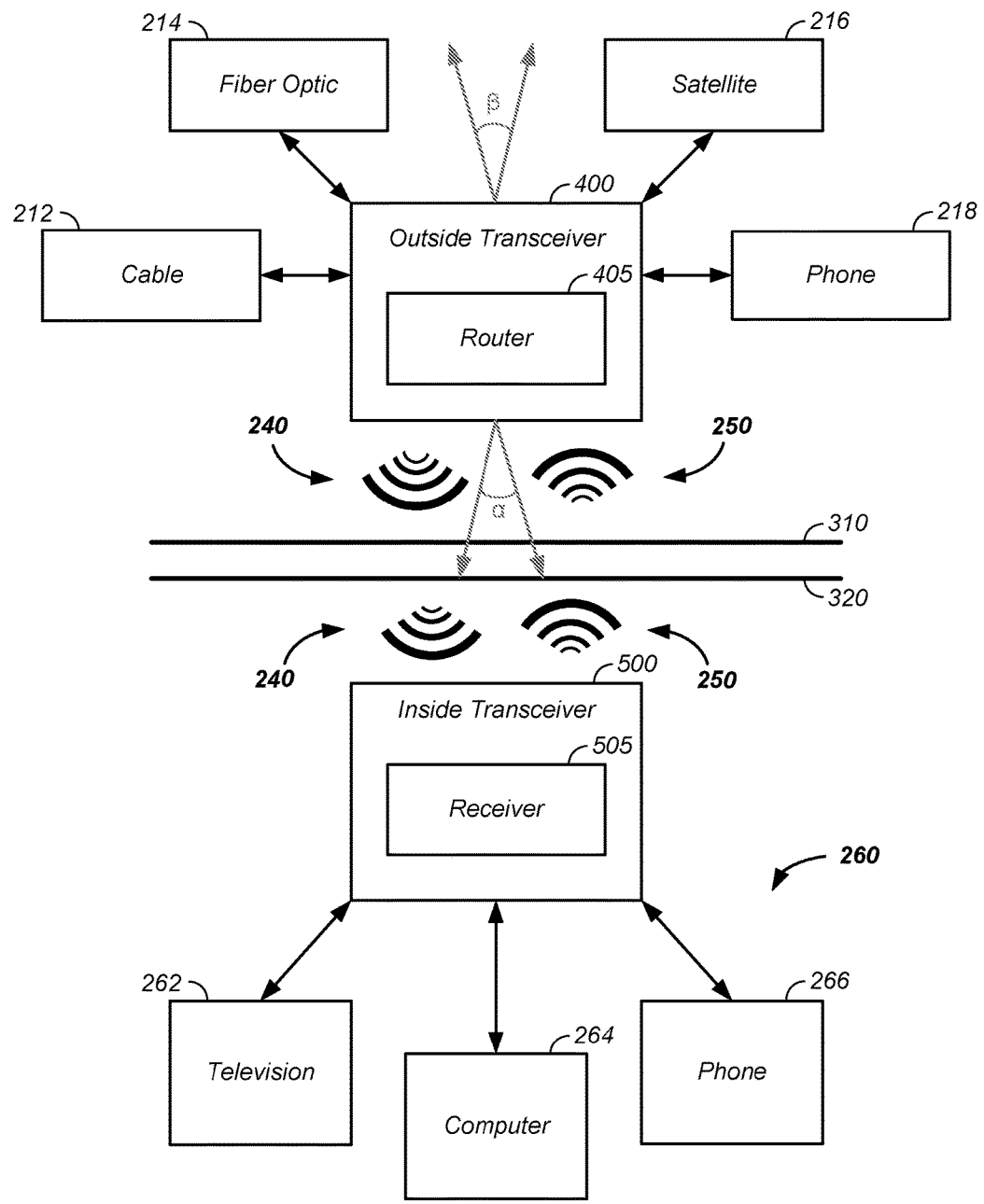
FIG. 3 illustrates an outside transceiver linked to an inside transceiver for data communication through a structure perimeter.

Referring now to FIG. 3, generally in the first case of using the outside transceiver 400, described supra, the outside transceiver 400 is configured with connectors, electronics, programmed interfaces, and/or programmed intelligence to receive a signal from a person, a business, and/or a communication device outside of the structure. Examples of means of receiving the information include via a cable 212, via a fiber optic 214, via a satellite 216, and/or via a digital phone network, phone network and/or phone line 218. To still further illustrate, one or more means of receiving are used for one or more sources of information. For instance, an internet signal optionally arrives via the cable 212, the fiber optic 214, the satellite 216, Wi-Fi enabled device, cellular phone, and/or the phone line 218, such as a digital phone line. Optionally the fiber optic input uses an optical network terminal that translates pulses of light used to carry data over a fiber optic cable into electric signals that are recognized by a computer or electronic device.

Still referring to FIG. 3, the inside transceiver 500 is configured with connectors, electronics, chips, and/or program code to receive an in-bound wireless signal 240 from the outside transceiver 400. The inside transceiver 500 distributes the signal received through the outer wall 200 to one or more of a television 262, a computer 264, and a phone 266. Optionally, the outside transceiver 400 directly transmits signal through the outer wall 300 to one or more of the television 262, the computer 264, and the phone 266. For example, optionally and preferably the outside transceiver 400 sends a wireless signal through the outer wall 200 directly to a receiver and/or transceiver associated with, partially embedded into, and/or embedded within each of a plurality of Wi-Fi enabled devices, such as a first, second, third, or $n^{th}$ television, phone, computer, or other Wi-Fi enabled device, where n is a positive integer. For example, a first receiver is associated with a first Wi-Fi device, a second receiver is associated with a second Wi-Fi device, and a third receiver is associated with a third Wi-Fi device.

The inventor particularly notes that wireless signals, from the outside transceiver 400, with a transmission range of less than 2000, 1500, 1000, 750, 500, 400, 300, 200, or 100 feet are preferred so as to: (1) limit interference with other systems, (2) prevent unauthorized access by another system, and/or (3) decrease ease of improper interception of the transmitted information. Further, limited broadcast range is optionally and preferably used as part of a business model of a service provided to charge a fee to each user. Herein transmission ranges are optionally defined as a distance from the outside transceiver with at least a fifty, seventy-five, or ninety percent decrease in intensity strength from that broadcast.

Figure 1B:
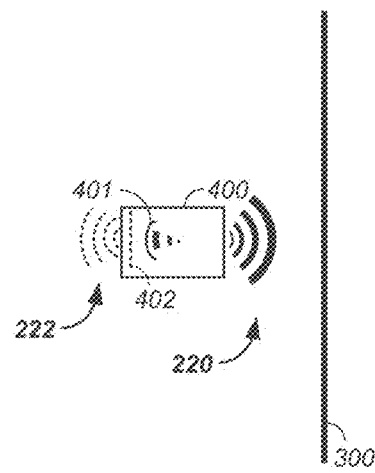

Referring now to FIG. 1B, optionally, a reflector 401 is used to direct the broadcast signal of the outside transceiver 400 over a first solid angle of less than one hundred thirty-five or ninety degrees, where the first solid angle has a midpoint toward the outer wall 300. Optionally, a reflective surface 402, a metal surface and/or a metallized surface is used to degrade the broadcast signal, from the outside transceiver 400, by at least fifty percent over a second solid angle 222 of at least forty-five degrees, where the second solid angle does not intersect the outer wall 300.

The outside transceiver 400 and/or the inside transceiver 500 are optionally and preferably each maintained in a semi-permanent/fixed position, such as with mounting hardware. For example, the outside transceiver 400 is semi-permanently affixed to an outside surface, such as an outer surface of the outer wall 300. The semi-permanent attachment optionally uses an adhesive and/or attachment hardware.

Still referring to FIG. 3, in yet another embodiment the outside transceiver 400 is optionally inserted, partially inserted, and/or embedded through an outer structure element 310, such as through an outer surface of the outer wall 300, while not penetrating through an innermost structure element 320, such as an interior surface and/or interior finish of the outer wall 300.

In still yet another embodiment, the outside transceiver 400 is positioned and/or solidly mounted within a garage of the structure, which provides protection against environmental elements such as wind, heat, sun, and water; provides access to electrical power; provides access to non-intrusive mounting surfaces; and/or provides a physical barrier/deterrent to theft. In this embodiment, semi-intrusive access is granted, for installation of the outside transceiver, to a representative, a contractor, or an employee of a company without granting access to the subscriber's or user's interior residence, thereby easing risk to the homeowner and easing constraints on the homeowner, such as required time and presence of the subscriber or user.

Herein, an interior living structure or a living space is surrounded by a perimeter, through which the outside transmitter 400 broadcasts a signal. In one embodiment, the garage is outside of the perimeter. In many regions of the United States, the living space is defined as an air conditioned space, such as a heated space.

The above provided restrictions at least exclude direct reception of signal by the inside transceiver 500 from any of: a satellite, a cell phone tower, a television station, and/or a radio station with a range exceeding one thousand feet and/or a mobile, not semi-permanently affixed to a surface, phone, phablet, or tablet used outside of the structure. For instance, the above provided restrictions optionally force the outside transceiver to be semi-permanently affixed to a surface, which starkly contrasts with outdoor use of a laptop, phone, phablet, or tablet.

The outside transceiver 400 and inside transceiver 500 optionally communicate with any wireless protocol. Several non-limiting communication protocol examples are provided in Table 1. While Table 1 provides examples of n, ac, dc, ah, aj, and ax protocols, any wireless communication protocol, system, and/or method is optionally used, such as any future Wi-Fi standard, any future 802.11 standard, and/or any international standard. The Federal Communication Commission (FCC) power requirements effectively limit the broadcast range of a transmitter/receiver combination.

TABLE 1

Communication Protocol Emission Limits

| Protocol (802.11) | Frequency (Hz) | Emission Limit | FCC 47 CFR rule part |
|---|---|---|---|
| n | 2.4 GHz | 50,000 μV/m @ 3 m (any transmission type) | 15.249 |
| n | 2.4 GHz | 5,000 μV/m @ 3 m (periodic transmissions) | 15.231 |
| n | 5 GHz | 500 μV/m @ 3 m | 15.205 |
| n | 5 GHz | 50,000 μV/m @ 3 m | 15.249 |
| ac | 5 GHz | 500 μV/m @ 3 m | 15.205 |
| ad | 60 GHz | 500 μV/m @ 3 m | 15.205 |
| ah | 900 MHz | 5,000 μV @ 3 m | 15.209 |
| aj | 45/60 GHz | 100 μv/m @ 3 m (45 Ghz); and 500 μv/m @ 3 m (60 Ghz) | 15.205 |
| ax | 2.4/5 GHz | Emission Limit TBD upon release date | TBD |

Combined/Encrypted Signals

Optionally, one transceiver, such as the outside transceiver 400 and/or inside transceiver 500, transmits and/or receives one, two, or three types of signals, such as signal types of a television, internet, digital phone signal, or phone signal, in an encrypted fashion. Optionally, the signal types are transmitted virtually simultaneously and/or are interleaved from a single point, where the single point is inside or outside of the structure. For example, one transceiver optionally sends a first type of signal during a first set of points in time and a second type of signal during a second set of points in time where the first and second sets of points in time overlap in time. The points of time are optionally separated by less time than the human ear perceives or the human eye observes, such as by less than 0.05, 0.01, 0.001, 0.0001, or 0.00001 second. Hence, one transceiver is optionally and preferably used where multiple transceivers were required in the past, which reduces space requirements, complexity, and installation time. Optionally the signal types, television, internet, or phone, are encrypted using different encryption algorithms even in the transmission of combined signals.

Signal communicated between the outside transceiver 400 and inside transceiver 500 is optionally encrypted. In a first case, signal entering the structure is encrypted. In a second case, signal exiting the structure is encrypted. In a third case, both incoming and outgoing signals are encrypted. In a fourth case, the localized communication apparatus 100 allows a homeowner, businessman, and/or user to selectively encrypt signals being transmitted out of the structure. In the fourth case, a hardware selectable element and/or a software driven user interface is used to define what is to be encrypted, how the signal is to be encrypted, when the data is to be encrypted, and/or from what devices inside the structure signal is to be encrypted.

In a first example, data for one, two, or all of internet, television, and digital voice are optionally encrypted and transmitted wirelessly, simultaneously, and/or on the same frequency, using a single router. In a case of a single weatherproof router, the router is optionally located outside of the place of service, such as on the roof.

In a second example, each device receiving information from or sending information to a single router, optionally has its own unique service set identifier (SSID) code, which is a case sensitive, alphanumeric character unique identifier attached to the header of packets sent by a router over a wireless local area network (WLAN), corresponding to that single router. For instance, the router is used to send out many different packets of information very quickly to a plurality of devices, such as to n devices where n is a positive integer where each device is logged on to a certain encrypted router with a specific SSID code. The router sends out packets of information to the n devices so quickly, due to its speed and bandwidth, that to the end user the information appears seamless.

In a third example, there is enough bandwidth and speed with the routers and processors to allow sending out and receiving information to multiple points of reception/transmission at the same time, even with high transmission requirements of multiple channels of high-definition video. For extreme bandwidth requirements, such as a sports bar with 10, 20, 30 or more televisions, a second router device with a different SSID is used to send addressed data or packets to only the receivers with that specific corresponding SSID address. In another example of an extreme bandwidth requirement of a company with at least hundreds of internet connections, user-defined priorities are optionally set in the router to automatically set bandwidth limits. For example, C-level executive use and/or critical applications are prioritized.

In a fourth example, a single router is used in either an inside or outside environment, that: (1) transmits, with encryption, either an incoming television signal to one or more television sets, (2) transmits and receives encrypted signals containing internet data, and (3) transmits and receives encrypted digital telephone data simultaneously. Herein, the single router used to essentially simultaneously transmit multiple signal types is referred to as a multimedia router.

Figure 4A:
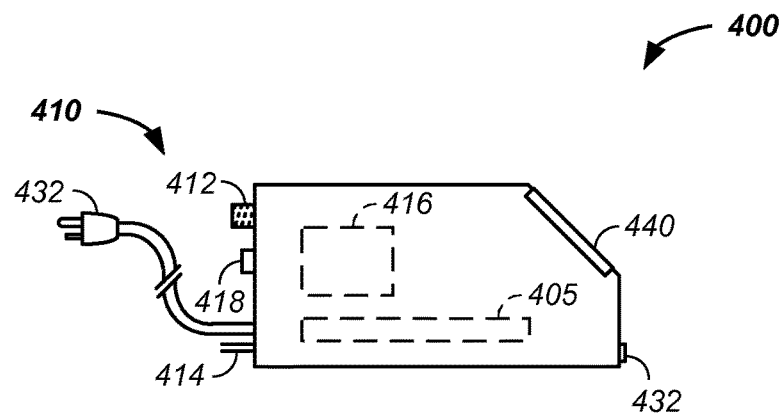
FIG. 4A and FIG. 4B illustrate an outside transceiver from a side view and a top view, respectively.
Figure 4B:
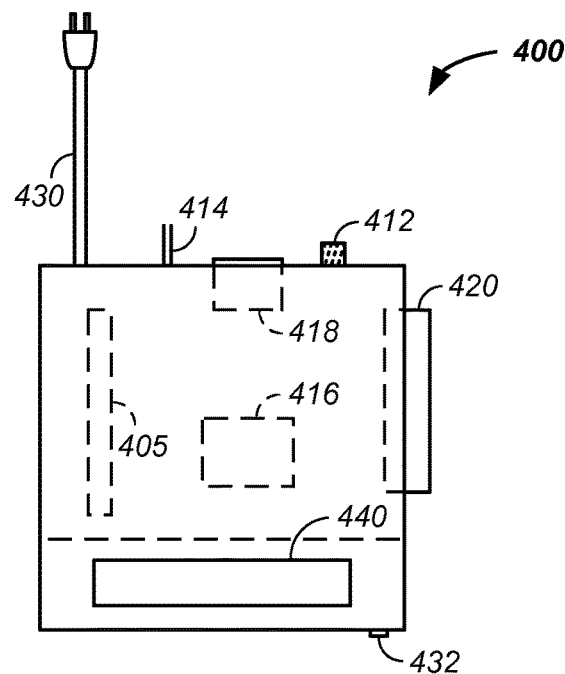

Referring now to FIG. 4A and FIG. 4B, an example of the outside transceiver 400 is provided. As illustrated, the outside transceiver 400 optionally includes: (1) an internal router 405; (2) a source connector 410, such as a co-axial cable connector 412, a fiber optic connector 414, and/or a phone jack connector 418; (3) a wireless transmitter 416 and/or an internal or external antennae; (4) a power cord 432 and power indicator 432; and/or (5) a user interface 440. The user interface is optionally a touch screen, such as a capacitive touch screen; and/or a lit display. The first user interface 440 is optionally tilted off of horizontal by more than twenty and less than seventy degrees, such as about forty five degrees, to allow easy visualization and/or access while mounted, such as on a horizontal surface. The outside transceiver 400 is optionally of any geometry and/or any size, but a form factor of about 4×2×2 inches is preferred.

Figure 5A:
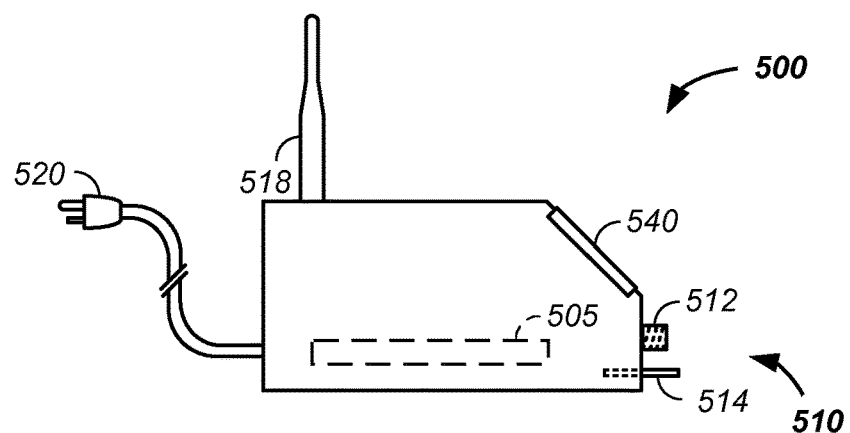
FIG. 5A and FIG. 5B illustrate an inside transceiver from a side view and a top view, respectively.
Figure 5B:
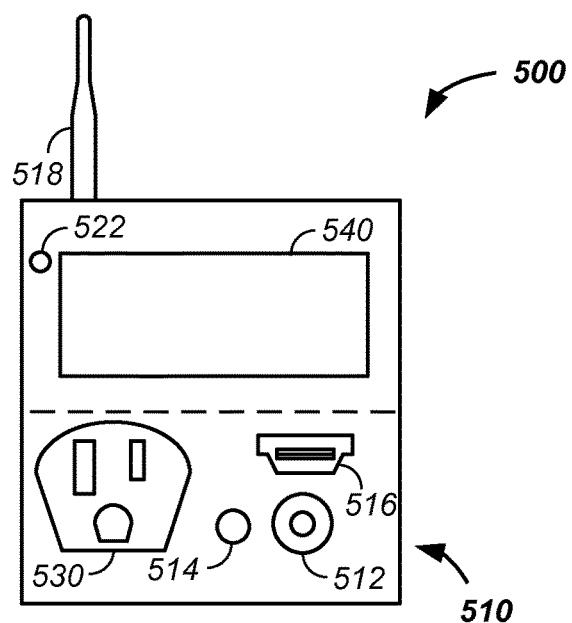

Referring now to FIG. 5A and FIG. 5B, an example of the inside transceiver 500 is provided. As illustrated, the inside transceiver 500 optionally includes: (1) an internal receiver 505; (2) one or more delivery connectors 510, such as an output co-axial cable 512; an output fiber optic port 514; an output HDMI port, such as for an HDTV, an output universal serial bus (USB) port; an internal transceiver antennae 518, which is optionally external or internal; (3) a power line 520 and on/off indicator 522; and (4) a second user interface 540 having any of the properties of the first user interface 440.

The localized communication apparatus 100 or system for communication of information through an outer perimeter of a structure system controller optionally comprises one or more subsystems stored on a client. The client is a computing platform configured to act as a client device or other computing device, such as a computer, personal computer, a digital media device, and/or a personal digital assistant. The client comprises a processor that is optionally coupled to one or more internal or external input device, such as a mouse, a keyboard, a display device, a voice recognition system, a motion recognition system, or the like. The processor is also communicatively coupled to an output device, such as a display screen or data link to display or send data and/or processed information, respectively. In one embodiment, the communication apparatus 100 is the processor. In another embodiment, the communication apparatus 100 is a set of instructions stored in memory that is carried out by the processor.

The client includes a computer-readable storage medium, such as memory. The memory includes, but is not limited to, an electronic, optical, magnetic, or another storage or transmission data storage medium capable of coupling to a processor, such as a processor in communication with a touch-sensitive input device linked to computer-readable instructions. Other examples of suitable media include, for example, a flash drive, a CD-ROM, read only memory (ROM), random access memory (RAM), an application-specific integrated circuit (ASIC), a DVD, magnetic disk, an optical disk, and/or a memory chip. The processor executes a set of computer-executable program code instructions stored in the memory. The instructions may comprise code from any computer-programming language, including, for example, C originally of Bell Laboratories, C++, C#, Visual Basic® (Microsoft, Redmond, Wash.), Matlab® (MathWorks, Natick, Mass.), Java® (Oracle Corporation, Redwood City, Calif.), and JavaScript® (Oracle Corporation, Redwood City, Calif.).

Still yet another embodiment includes any combination and/or permutation of any of the elements described herein.

Herein, a set of fixed numbers, such as 1, 2, 3, 4, 5, 10, or 20 optionally means at least any number in the set of fixed number and/or less than any number in the set of fixed numbers.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for localized communication, comprising the steps of:
    mounting an outside communication device on a vertical exterior perimeter of a living structure;
    said outside communication device transmitting a wireless signal through said vertical exterior perimeter of the living structure, wherein the wireless signal transmits over a range of less than one hundred feet, the wireless signal comprising data received via at least one of a fiber optic and a cable from a service provider, said outside communication device semi-permanently mounted outside of said vertical exterior perimeter, the wireless signal comprising an Institute of Electrical and Electronics Engineers (IEEE) compliant standard signal;
    an inside communication device receiving the wireless signal, wherein the vertical exterior perimeter of the living structure is not penetrated by a communication wire connecting said outside communication device to said inside communication device, wherein the wireless signal degrades at least ninety percent in less than one thousand feet;
    said outside communication device directing the wireless signal over a first solid angle of less than one hundred thirty-five degrees toward an element of the vertical exterior perimeter; and
    said outside communication device degrading a range of the wireless signal, as determined by at least a fifty percent decrease in intensity, over a second solid angle of at least forty-five degrees, said second solid angle not intersecting the vertical exterior perimeter.

2. The method of claim 1, further comprising the step of:
    a contractor installing: (1) said fiber optic to said outside communication device and (2) said outside communication device in a garage, wherein the vertical exterior perimeter comprises a separation between an interior living area and said garage, said contractor step of installing not requiring said contractor to enter the interior living area.

3. The method of claim 1, wherein said vertical exterior perimeter of the living structure comprises an interior finish wall of the living structure, said outside communication device at least partially embedded in an outside wall of the living structure.

4. The method of claim 1, further comprising the step of:
    positioning all of the outside communication device in a garage associated with the living structure, the vertical exterior perimeter of the living structure comprising a separation between the living structure and a garage.

5. The method of claim 1, further comprising the step of:
    orientating a display screen of said outside communication device at an angle between twenty and seventy degrees off of the vertical surface.

6. The method of claim 1, further comprising the step of:
    said inside communication device distributing the wireless signal to at least two devices, the two devices comprising two separate service set identifier (SSID) codes.

7. The method of claim 6, further comprising the step of:
    said inside communication device distributing the wireless signal to at least two of: a television, a tablet, and a phablet.

8. The method of claim 7, further comprising the step of:
    encrypting the wireless signal broadcast from the outside communication device.

9. The method of claim 1, further comprising the step of:
    said outside communication device alternatingly transmitting a first signal type for a first time duration and a second signal type for a second time duration, said first time duration and said second time duration separated by less than one hundredth of a second.

10. The method of claim 9, further comprising the steps of:
    said outside communication device compressing the first signal; and
    said inside communication device decompressing the first signal.

11. The method of claim 1, further comprising the step of:
    said IEEE compliant signal transmitting the wireless signal in compliance with at least one of: an IEEE Wi-Fi 802.11n signal standard; an IEEE 802.11ac signal standard, and an IEEE 802.11ax standard,
    said outside communication device comprising at least one of: an outside transceiver, an outside receiver, and an outside router.

12. The method of claim 11, said outside communication device comprising a weatherproof, high-speed/high-bandwidth transceiver.

13. The method of claim 11, further comprising the step of:
encrypting an outgoing signal passing through the exterior vertical wall from said inside communication device to said outside communication device,
said inside communication device comprising at least one of: an inside transceiver, an inside receiver, and an inside router.

14. An apparatus for localized communication, comprising:
an outside communication device comprising a first transceiver configured to transmit a wireless signal through an exterior perimeter of a living structure, wherein the wireless signal transmits over a range of less than one hundred feet during use, the wireless signal comprising data received via a cable, from a service provider, said outside communication device semi-permanently mounted outside of said exterior perimeter, the wireless signal comprising an Institute of Electrical and Electronics Engineers (IEEE) compliant standard signal, said outside communication device further comprising a reflective surface configured to yield a reduced range, characterized by at least a fifty percent reduction in intensity, of a portion of the wireless signal broadcast over a solid angle not intersecting the exterior perimeter;
an inside communication device comprising a second transceiver configured to receive the wireless signal, wherein the exterior perimeter of the living structure is not penetrated by a communication wire connecting said outside communication device to said inside communication device, wherein the wireless signal degrades at least ninety percent in less than one thousand feet.

* * * * *